United States Patent Office 2,938,876
Patented May 31, 1960

2,938,876

PROCESS OF MAKING REINFORCED RUBBER PRODUCTS AND ADHESIVES

Thomas C. Morris, deceased, late of Lexington, Mass., by Edith J. Morris, Lexington, administratrix, and Conrad Rossitto, Lawrence, Mass., assignors to B. B. Chemical Co., Boston, Mass., a corporation of Massachusetts No Drawing. Filed May 3, 1957, Ser. No. 656,992

4 Claims. (Cl. 260—3)

This invention relates to an improvement in the manufacture of compositions containing solvent soluble reinforcing agents and rubbery polymers and particularly adhesive solutions.

In the copending application of Thomas C. Morris et al., Serial No. 590,351, filed June 11, 1956, entitled "Rubber Additives and Rubber Compositions Containing the Same," there is disclosed a new class of reinforcing agents effective to coact with rubbery diene polymers to give high strength rubber products. These reinforcing agents differ from reinforcing agents previously described in that they are soluble in organic solvents but are substantially infusible. That is, the reinforcing agents show no sign of melting at temperatures up to 200° C. at which temperature they show signs of thermal decomposition. Because of this combination of characteristics, these materials are readily incorporated in rubber compositions to form stable products but give exceptionally effective reinforcing action even at high temperatures because they do not soften with heat. The reinforcing agents of the copending application are the reaction products of certain metal oxides with certain alkyl and aryl substituted phenol aldehyde resins.

It is a feature of the present invention to form compositions including an organic solvent soluble reinforcing agent resembling the reinforcing agent of said copending application in that it is substantially infusible but differing from that reinforcing agent in being the reaction product of less expensive combination of reagents.

It has now been found that the organic solvent-insoluble magnesium and lead oxides can be caused to react with polymerized rosin and certain alkyl or aryl substituted phenol aldehyde resins to form substantially infusible organic solvent-soluble products providing a reinforcing action when combined with rubbery diene polymers.

The product formed by reaction of the metal oxide, the polymerized rosin and the substituted phenol aldehyde resin in organic solvent is a liquid solution. This solution of reaction product contains a small portion ranging from 2% to 10% of insoluble by-product which remains suspended in the reaction mixture. This suspended material does not interfere with incorporation of the reinforcing agent into rubber products which are to be used promptly; but it has been found important to remove these materials from suspension either by decantation, filtering or coagulation where the reinforcing agent is to be added to rubbery solutions which must be stable over extended periods.

Manufacture of the reinforcing agent may be effected by a simple combination of the reacting metal oxide, polymerized rosin and phenolic resin in organic solvent solution. The metal oxide material is maintained in suspension by continued agitation and the reaction, which is exothermic, will commence and continue to completion at room temperature.

The phenol aldehyde resins useful in the present reaction product are the heat advancing, oil soluble, alkali catalyzed condensates of alkyl or aryl monosubstituted phenols and an aldehyde. It has been found that the substituent radical must contain at least three carbon atoms since solubility of the resin in the organic solvent to bring it into a state suitable for reaction is dependent on and increases with the size of the substituent radical. Useful substituted phenols include para-tertiary-amyl phenol, para-tertiary-butyl phenol, and para-phenyl phenol. The phenol aldehyde resins also are characterized in having a high methylol content such as is obtained through a relatively high ratio of aldehyde such as formaldehyde to the phenol. This ratio must be greater than 1:1 and may be as high as 2:1.

In these resins the methylol groups appear to offer points of exceptional reactivity and perhaps of adhesion. The ease with which they form salts with metal oxides and the solubility of the salts in a wide variety of solvents, coupled with their substantial infusibility, make them extremely useful in solvent cements. Acid catalyzed resins which do not possess the methylol groups showed no evidence of reaction with the metal oxides and no increase in melting point or in effectiveness of coaction with rubbery polymers.

Of the polymerized rosin materials, the preferred material is dimerized rosin which is a dibasic acid obtained by polymerizing rosin and available commercially under the trade names of Dimer 120, sold by Newport Industries, Inc., and Dymerex, sold by Hercules Powder Co. Other polymerized rosins which may be used are the materials known as Poly-pale resin, sold by the Hercules Powder Co., and the material known as Penros, sold by Newport Industries, Inc.

The polymerized rosin materials are employed with the phenol aldehyde resins to the extent of from about 5% to about 60%, preferably from 40% to 60% by weight based on the weight of the phenol aldehyde resin.

Magnesium oxide reacts with the phenol aldehyde resin and polymerized rosin to form organic solvent-soluble compounds which contain as determined by combustion analysis from about 6% to about 9.0% combined magnesium calculated as MgO. Lead oxide also reacts with these mixtures to form soluble compounds which contain from about 25% to about 30% by weight combined lead calculated as lead oxide.

These reaction products are soluble in a variety of organic solvents. It is preferred to use solvent mixtures including at least about 5% and preferably not over about 15% by volume of aromatic organic solvent liquids. Above this limit of aromatic content the amount of insoluble material remaining suspended in the reaction mixture even after the settling period, and the bond strength of joints formed by such solution is adversely affected. On the other hand, the aromatic solvent is highly effective for dissolving the reaction product so that it is desirable that it be present in amount of at least the lower limit. It will be understood, however, that these limits are not hard and fast and that useful results have been obtained with adhesive compositions including up to as much as 25% of aromatic material. The solvent mixture will contain an ester or ketone type solvent such as ethyl acetate, methyl ethyl ketone and the like to the extent of from about 5% to about 30% by volume. Together with the aromatic and the ketone or ester type of solvent there will ordinarily be used a hydrocarbon diluent such as petroleum naphtha, cyclohexane or hexane. Solvent mixtures are readily compounded to provide necessary volatility to give desired drying rates for particular mixtures.

The reaction products are stable and are effective to give a reinforcing action on rubbery diene polymers. The reaction product of magnesium oxide, the polymerized rosin and the substituted phenol aldehyde resin does not appear to combine chemically with the rubbery polymer and gives no indication of a cross linking type of vulcanization at room temperature. Films deposited from solutions of the rubbery polymer and the magnesium-polymerized rosin-phenol aldehyde resin product will redissolve when treated with solvent. Likewise, by appropriate solvent extraction techniques, the reaction product may be recovered unchanged even from films which have been cast for a substantial period. It is believed that the effect of the magnesium-polymerized rosin-phenol aldehyde resin reaction product is primarily a physical one in which the infusible reaction product cooperates with the rubbery polymer, in which it is soluble, both to raise the melting point of the combination to give superior resistance to heat, and to make the mixture tougher and stronger because of the hardness of the reaction product.

A further action in addition to the physical action may be obtained where the metal oxide is lead oxide possessing per se non-sulfur vulcanizing action on certain rubbery polymers. This lead reaction product gives the two-fold action of presenting the metal in soluble form in which it can react most efficiently with the rubbery polymer and at the same time providing the physical effect discussed above which gives greater heat resistance and greater toughness and strength.

Thus in a polychloroprene base adhesive including the lead compound, the initial bond strength of the adhesive usually doubles in the space of two days, and in many instances the final bond strength has been found to be several times the initial bond strength. As little as five parts of the lead-polymerized rosin-phenol aldehyde resin reaction product with 100 parts of polychloroprene in a solvent type adhesive will give on aging an improvement in bond strength of at least about 100% whether tested at room temperature or at the 140° F. test required by certain military specifications.

The metal oxide-polymerized rosin-phenol aldehyde resin reinforcing agents have been found nearly as effective on a weight for weight basis as the more expensive metal oxide-phenol aldehyde resins of the above referred to copending application as regards their reinforcing or curing action on polychloroprene rubbers. They are also effective to coact with other vulcanizable diene polymer rubbers to give desirable properties. Thus improvement in strength, heat resistance and other physical properties are obtained by combining the metal oxide-polymerized rosin-phenol formaldehyde resin reaction products with rubbers such as natural rubber, butadiene-acrylonitrile copolymer rubbers, "butyl rubbers," i.e. copolymers of 98% isobutylene with 2% of a diolefin, usually isoprene, and butadiene-styrene copolymer rubbers.

To achieve the desired reinforcing action of the metal oxide-polymerized rosin-phenol formaldehyde resin reaction product with rubbers it is desirable to employ at least about 5% by weight based on the weight of the rubber component and it is often desirable to employ as much as 100% or more by weight of the reaction product to obtain a strong reinforcing action.

The reaction product of metal oxide, polymerized rosin and phenol aldehyde resin may be used either in the reaction solution for combination with rubber solutions or may be dried to a brittle, infusible solid. This solid may be redissolved for combination with rubber solutions or may be incorporated in finely ground condition into rubber mixes.

As in the case of the metal oxide-phenol aldehyde resin reaction solutions of the copending application referred to, it is desirable to remove insoluble suspended matter from the reaction solutions of the present invention. The insoluble suspended matter is coagulated where the reaction mixture is dried and then redissolved. Elimination of the insoluble matter may also be achieved by filtration, settling, and other techniques. It is to be understood that the term "substantially free from uncoagulated solvent insoluble components" refers to products in which the insoluble materials have been coagulated as in drying or removed by physical separation as by decantation or filtration.

Solutions of the metal-polymerized rosin-phenol aldehyde resin compounds are particularly valuable for use in adhesives of the rubber base type. These adhesives may be prepared by simple solution of the rubber component in a suitable volatile organic solvent followed by admixture of the solution of the metal-resin compound. Adhesive solutions containing the metal-polymerized rosin-phenol aldehyde resin compounds which have been treated to remove uncoagulated suspended matter, show excellent stability so that in many cases they serve as complete one-part curing adhesives which can take the place of previously required two-part adhesives in which vulcanization accelerators and vulcanization activators have had to be incorporated in separate parts of the adhesive and mixed immediately before use. Up to 10 parts by weight of lead-polymerized rosin-phenol aldehyde resin compound in a body of adhesive containing 100 parts by weight of polychloroprene or a butadiene-acrylonitrile copolymer rubber has been found stable over substantial periods; but use of over 10 parts by weight of the lead-polymerized rosin-phenol aldehyde resin compound with 100 parts by weight of the rubber causes slow vulcanization at room temperature with gelling. No stability problems have been encountered with the magnesium-polymerized rosin-phenol aldehyde resin compound free from suspended matter.

The preceding disclosure has been concerned primarily with the use of the metal-polymerized rosin-phenol aldehyde resin compounds in solution in volatile organic solvents. However, the dry, brittle, metal-polymerized rosin-phenol aldehyde resin compound recovered from the solution as by evaporation of the solvent may be combined with a natural or synthetic rubber in conventional milling procedure and appears to dissolve in the rubber on the mill. Such milled compositions may be molded or extruded by standard procedures and the final products possess characteristics comparable to those obtainable by curing with sulfur. The rubbery compounds cured with the lead-polymerized rosin-phenol aldehyde resin compound are particularly valuable in that they tend to filter out ultra-violet light and therefore protect polychloroprene and butadiene-acrylonitrile copolymer rubbers from attack by such light. Additionally, the lead-polymerized rosin-phenol aldehyde resin compound is valuable in imparting heat stability.

The following examples are given to aid in understanding the invention and it is to be understood that the invention is not restricted to the particular proportions, materials or conditions set forth therein.

*Example I*

A solvent mixture was prepared comprising 70 parts by volume of petroleum naphtha, 20 parts by volume of methly ethyl ketone and 10 parts by volume of toluol.

To 300 grams of this solvent mixture there were added 40 grams of the alkali catalyzed resin condensate of paraphenyl phenol and formaldehyde containing more than one mol of formaldehyde per mol of the paraphenyl phenol (Bakelite Resin BR3360), 60 grams of dimerized rosin, 7 grams of magnesium oxide, and 0.3 gram of glacial acetic acid.

The mixture was vigorously stirred and there was evidence of reaction including the evolution of heat, a darkening of the solution, a noticeable disappearance of the magnesium oxide, and an increase in viscosity. The reaction was allowed to proceed for 7 hours with gentle stirring and the reaction mixture was then allowed to stand overnight. Solid material settled out of the solution and the clear supernatant liquid was decanted and filtered.

Five (5) parts by weight of magnesium oxide and 2 parts by weight of zinc oxide were milled into 100 parts be weight of polychloroprene. The milled material was sheeted out, cut up and put in a churn and dissolved in the solvent mixture to form a 14.75% by weight polychloroprene solution. 100 parts by weight of this polychloroprene solution is blended with 59.1 parts by weight of the reacted resin solution. This formulation was stable on standing, i.e. showed no flocculation. The cement was used for bonding leather to aluminum. One inch strips of the bonded leather and aluminum were subsubjected to peel pull tests at two inches per minute. At the end of 18 hours a bond strength of 15 lbs. was obtained. After three days the bond was 25 lbs. and after 5 days the bond was 37 lbs.

*Example II*

A solvent mixture of the following composition was prepared:

|  | Percent by volume |
|---|---|
| Toluol | 15 |
| Methyl ethyl ketone | 25 |
| Hexane | 60 |

To 3 gal. of this solvent mixture there were added 947 grams of the paraphenyl phenol formaldehyde resin used in Example I, 1033 grams of dimerized rosin, 15.8 grams of glacial acetic acid, and 158.4 grams of magnesium oxide. This mixture was caused to react and was decanted and filtered as in Example I.

150 grams of the reacted resin solution were combined with 19.4 grams of polychloroprene and 4.75 grams of a milled mixture of polychloroprene containing 10% zinc oxide. After agitating to form a smooth solution the adhesive was tested on the bonding of leather to aluminum. One inch wide strips were prepared and subjected to a peel pull test. The bond at the end of one day was 27 lbs., at the end of 4 days was 48 lbs., and at the end of 18 days was 54 lbs.

*Example III*

A series of reaction mixtures was prepared in which the reactant materials were:

|  | Parts by weight |
|---|---|
| Paraphenyl phenol formaldehyde resin | 31.7 |
| Dimerized rosin | 35 |
| Magnesium oxide | 5.3 |
| Glacial acetic acid | .53 |

Solutions containing 30% by weight of the above mixture were prepared and reacted in the following series of solvents:

|  | Parts by Volume ||||| 
|---|---|---|---|---|---|
|  | A | B | C | D | E |
| Naphtha | 60 | 60 | 60 | 60 | 55 |
| Methyl ethyl ketone | 40 | 35 | 30 | 35 | 40 |
| Toluol |  | 5 | 10 | 15 |  |
| Cyclohexane |  |  |  |  | 5 |

The materials were reacted for 7 hours and permitted to stand overnight. It was found that the liquid above the settled solids in the composition employing solvent mixture D was somewhat cloudy, indicating that the solid matter had not entirely settled. The material was difficult to filter because of the presence of suspended matter in the liquid separated by decantation. These adhesive mixtures were used to bond leather to aluminum and the following results were obtained.

| Bond Test—Leather to Aluminum 1″ strips peel pull | A | B | C | D | E |
|---|---|---|---|---|---|
| 1 day pounds | 15 | 17 | 16 | 13 | 14.5 |
| 4 day pounds | 33 | 33 | 36 | 30 | 29 |

*Example IV*

Paraphenyl phenol formaldehyde resin and dimerized resin were dissolved in a solvent mixture and magnesium oxide was added together with acetic acid. The mixture was allowed to react in a rotating container for 8 hours. The mixture was allowed to settle overnight and the clear top layer drawn off and used in making up a cement.

The proportions used in this reaction mixture are as follows:

16 gal. 25 oz. naphtha (having negligible benzol content)
9 gal. 57½ oz. methyl ethyl ketone
1 gal. 44¾ oz. toluol
13 lb. 8 oz. paraphenyl phenol aldehyde resin (BR3360)
14 lb. 11½ oz. dimerized rosin
102 grams glacial acetic acid
2 lb. 4 oz. magnesium oxide 11.4 oz. of polychloroprene were milled with 1.4 oz. of zinc oxide, and this milled mixture together with 3 lbs. 15 oz. more of polychloroprene were dissolved in 4 gal. 80 oz. of the resin solution. In the final composition there were present 100 parts of polychloroprene, 47.8 parts of paraphenyl phenol formaldehyde resin and 52.2 parts of dimerized rosin.

This adhesive was found useful as a primer for securing rubber gaskets to painted metal surfaces.

*Example V*

A solvent mixture was prepared comprising 70 parts by volume of petroleum naphtha, 20 parts by volume of methyl ethyl ketone, and 10 parts by volume of toluol.

Alkali catalyzed resin condensate of paraphenyl phenol and formaldehyde containing more than one mol of formaldehyde per mol of the paraphenyl phenol (Bakelite Resin BR3360) was dissolved to form a 40% by weight solution in a portion of the solvent mixture. Finely divided sublimed lead oxide was added to the resulting solution in amount to provide 35% by weight based on the weight of the resin in the solution. The lead oxide added was vigorously stirred into the resinous solution. The lead oxide and resin reacted with evolution of heat, followed by a darkening of the solution and a noticeable disappearance of the lead oxide and increase in viscosity. The reaction was allowed to proceed for seven hours with occasional stirring and the reaction mixture was then allowed to stand overnight. Solid material settled out of the solution and the clear supernatant liquid was decanted and filtered.

Dimerized rosin was added to a further portion of the solvent mixture and dissolved to form a 40% by weight solution and finely divided sublimed lead oxide was added to the resulting solution in amount to provide 44% by weight based on the weight of the dimerized rosin in the solution. 2% glacial acetic acid based on the weight of the lead was added to the resulting mixture and the mixture was vigorously stirred. The lead oxide and the dimerized rosin reacted with some evolution of heat and darkening of the solution and the quantity of suspended lead oxide largely disappeared. The reaction was allowed to proceed for 6 hrs. in a rotating container and the reaction mixture was then allowed to stand overnight. Solid material settled out of the solution and the clear supernatant liquid was decanted and filtered.

Portions of the filtered liquid from the reaction of lead oxide and the phenol formaldehyde resin, and from the reaction of lead oxide and the dimerized rosin solution were dried over a steam bath, all traces of volatile matter being removed by vacuum drying at 70° C. for 5 hrs., at the end of the steam bath drying. In each case the dried material was a brittle, somewhat glassy looking solid which was readily ground. Combustion analysis of the lead oxide-phenol formaldehyde residue showed a lead oxide content of about 27% lead calculated as lead oxide.

Combustion analysis of the dried material from the reaction mixture of lead oxide and the dimerized rosin showed a lead content of 26.4% lead calculated as lead oxide. In each case the brittle glassy materials were infusible and showed no signs of softening at temperatures as high as 200° C. at which temperature evidence of decomposition of the compounds was observed. These materials remain soluble in solvents of the type used in their preparation.

The reaction mixture solutions were combined to provide a ratio based on the weight of the dissolved solids of 40 parts of the lead oxide-phenol formaldehyde with 60 parts of the lead oxide dimerized rosin material and this material was combined with a 15% solids solution of polychloroprene in the above solvent mixture to provide a composition containing 40% by weight of the combined lead oxide reaction products based on the weight of the polychloroprene. After agitating to form a smooth solution, the adhesive was tested for the bonding together of strips of polychloroprene-coated fabric. Coatings of the adhesive mixture were painted on the polychloroprene-coated fabric, allowed to dry for 30 minutes, second coatings were applied and allowed to dry for 1 hr., and the adhesive coated surfaces were then pressed together with ¾" overlap. Strips 2" wide were cut and dead load shear tests were run as indicated below. A test at the end of one day gave a value at failure of 74 lbs. A sample tested at the end of four days' aging failed at 250 lbs., and after six days' aging a test bond failed at 263 lbs.

Having thus described the invention, what is claimed as new and desired to be secured by Letters Patent of the United States is:

1. The process of making a reinforced rubber product comprising reacting in volatile organic solvent solution a heat-advancing oil-soluble alkali catalyzed condensate of a monosubstituted phenol of which the substituent is a hydrocarbon radical from the group consisting of aryl radicals and saturated alkyl radicals containing from three to six carbon atoms and formaldehyde in proportion greater than one mol and as high as two mols of formaldehyde to one mol of the substituted phenol and from 5% to 60% by weight of polymerized rosin based on the weight of said condensate with an oxide of a metal from the group consisting of magnesium and lead, the product of reaction being infusible and organic solvent soluble and containing combined metal to the extent of about 6% to about 9% by weight where the metal oxide is magnesium oxide and about 25% to about 30% by weight where the metal oxide is lead oxide, the weight of combined metal being calculated as the metal oxide, and combining the said reaction product with a vulcanizable diene polymer rubber from the group consisting of polychloroprene, natural rubber, copolymers of butadiene and acrylonitrile, copolymers of 98% isobutylene and 2% diolefin and copolymers of butadiene and styrene, the quantity of said reaction product being from about 5% to about 100% by weight based on the weight of the polymer rubber.

2. The process of making an adhesive comprising reacting in volatile organic solvent solution a heat-advancing oil-soluble alkali catalyzed condensate of a monosubstituted phenol of which the substituent is a hydrocarbon radical from the group consisting of aryl radicals and saturated alkyl radicals containing from three to six carbon atoms and formaldehyde in proportion greater than one mol and as high as two mols of formaldehyde to one mol of the substituted phenol and from 5% to 60% by weight of polymerized rosin based on the weight of said condensate, with an oxide of a metal from the group consisting of magnesium and lead, the product of reaction being infusible and organic solvent soluble and containing combined metal to the extent of about 6% to about 9% by weight where the metal oxide is magnesium oxide and about 25% to about 30% by weight where the metal oxide is lead oxide, the weight of combined metal being calculated as the metal oxide, and combining the said reaction product with a vulcanizable diene polymer rubber from the group consisting of polychloroprene, natural rubber, copolymers of butadiene and acrylonitrile, copolymers of 98% isobutylene and 2% diolefin and copolymers of butadiene and styrene in volatile organic solvent to form a joint solution of said polymer rubber and said reaction product, the quantity of said reaction product being from about 5% to about 100% by weight based on the weight of the polymer rubber.

3. The process of making an adhesive comprising reacting in volatile organic solvent solution a heat-advancing oil-soluble alkali catalyzed condensate of a monosubstituted phenol of which the substituent is a hydrocarbon radical from the group consisting of aryl radicals and saturated alkyl radicals containing from three to six carbon atoms and formaldehyde in proportion greater than one mol and as high as two mols of formaldehyde to one mol of the substituted phenol and from 40% to 60% by weight of polymerized rosin based on the weight of said condensate with magnesium oxide, the product of reaction being infusible and organic solvent soluble and containing from about 6% to about 9% by weight of combined magnesium calculated as magnesium oxide, and combining the said reaction product with a vulcanizable diene polymer rubber from the group consisting of polychloroprene, natural rubber, copolymers of butadiene and acrylonitrile, copolymers of 98% isobuylene and 2% diolefin and copolymers of butadiene and styrene in volatile organic solvent to form a joint solution of said polymer rubber and said reaction product, the quantity of said reaction product being from about 5% to about 100% by weight based on the weight of the polymer rubber.

4. The process of making an adhesive comprising reacting in volatile organic solvent solution a heat-advancing oil-soluble alkali catalyzed condensate of a monosubstituted phenol of which the substituent is a hydrocarbon radical from the group consisting of aryl radicals and saturated alkyl radicals containing from three to six carbon atoms and formaldehyde in proportion greater than one mol and as high as two mols of formaldehyde to one mol of the substituted phenol and from 40% to 60% by weight of polymerized rosin based on the weight of said condensate with lead oxide, the product of reaction being infusible and organic solvent soluble and containing from about 25% to about 30% by weight of combined lead, calculated as lead oxide, and combining the said reaction product with a vulcanizable diene polymer rubber from the group consisting of polychloroprene, natural rubber, copolymers of butadiene and acrylonitrile, copolymers of 98% isobutylene and 2% diolefin and copolymers of butadiene and styrene in volatile organic solvent to form a joint solution of said polymer rubber and said reaction product, the quantity of said reaction product being from about 5% to about 100% by weight based on the weight of the polymer rubber.

References Cited in the file of this patent

UNITED STATES PATENTS

| | | |
|---|---|---|
| 2,110,073 | Alvarado et al. | Mar 1, 1938 |
| 2,308,498 | Earhart et al. | Jan. 19, 1943 |
| 2,363,489 | Auer | Nov. 28, 1944 |
| 2,476,824 | Albert | July 19, 1949 |
| 2,572,071 | St. Clair et al. | Oct. 23, 1951 |
| 2,708,192 | Joesting et al. | May 10, 1955 |
| 2,726,222 | Palmquist et al. | Dec. 6, 1955 |
| 2,730,511 | Floyd | Jan. 10, 1956 |

FOREIGN PATENTS

| | | |
|---|---|---|
| 612,806 | Great Britian | Nov. 18, 1948 |
| 684,392 | Great Britain | Dec. 17, 1952 |
| 457,525 | Canada | Apr. 22, 1941 |